(No Model.)
R. C. NUGENT.
CENTERING DEVICE.
No. 460,883. Patented Oct. 6, 1891.
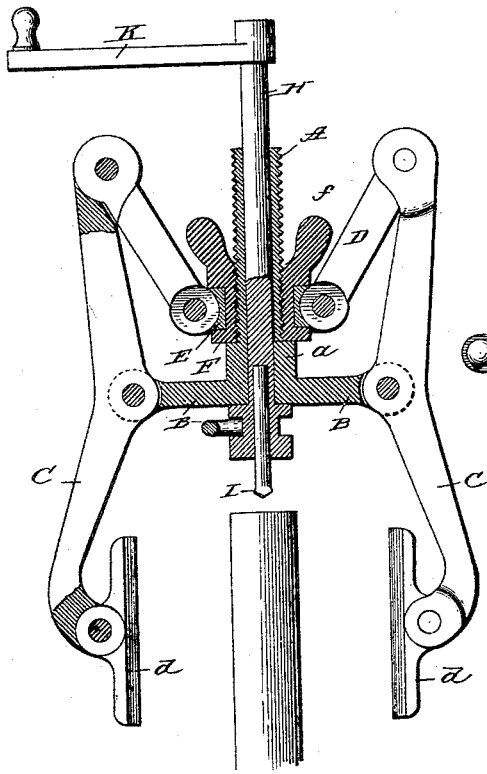
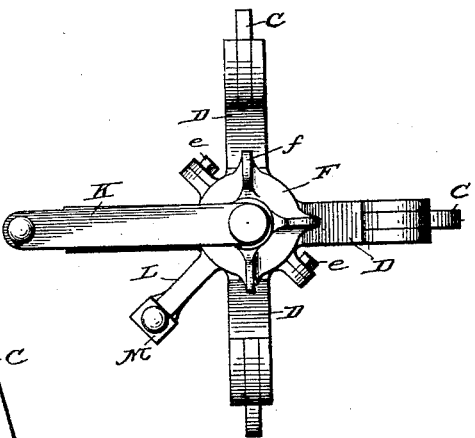
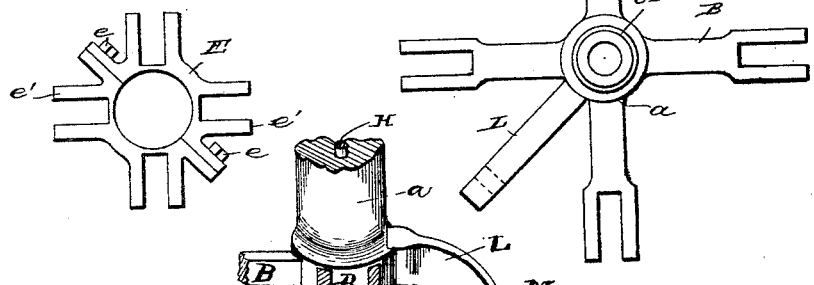
WITNESSES:
INVENTOR
Richard C. Nugent,
BY
Church & Church
HIS ATTORNEYS

UNITED STATES PATENT OFFICE.

RICHARD C. NUGENT, OF HARRISBURG, PENNSYLVANIA, ASSIGNOR OF ONE-HALF TO H. C. JENKINS, OF SAME PLACE.

CENTERING DEVICE.

SPECIFICATION forming part of Letters Patent No. 460,883, dated October 6, 1891.

Application filed November 18, 1890. Serial No. 371,855. (No model.)

*To all whom it may concern:*

Be it known that I, RICHARD C. NUGENT, of Harrisburg, in the county of Dauphin and State of Pennsylvania, have invented certain new and useful Improvements in Centering Devices; and I do hereby declare the following to be a full, clear, and exact description of the same, reference being had to the accompanying drawings, forming a part of this specification, and to the letters of reference marked thereon.

This invention relates to improvements in devices for indicating and, if desirable, drilling the central points of shafts, bars, &c., such devices being particularly designed for use to indicate the centers for lathe-work, &c.

The object of the invention is to provide a device of simple design and easily operated, which will clamp and center work of any shape in cross-section; and the invention consists in certain novel details of construction and combinations and arrangements of parts to be hereinafter described, and pointed out particularly in the claims at the end of this specification.

In the accompanying drawings, Figure 1 is a vertical sectional view through a centering device constructed in accordance with my invention. Fig. 2 is a top plan view of the same.
Fig. 3 is a top plan view of the frame to which the clamping-levers are pivoted. Fig. 4 is a corresponding view of the collar to which the inner ends of the lever-operating links are connected. Fig. 5 is a perspective view of the bottom of the frame, showing the lever, the top of the frame and parts of the arms being broken away.

Similar letters of reference in the several figures indicate the same parts.

The central portion of what may be termed the "frame" of the device consists of a tubular screw-threaded shank portion A, provided with a shoulder $a$ at the bottom, and a series of radial arms B, having their outer ends bifurcated and formed into bearings for the reception of the clamping and centering arms C. The arms B are four in number and have their outer ends bifurcated and formed into suitable bearings for the centering and clamping levers, said arms being regularly disposed in order that the work may be grasped from every direction simultaneously. For the purpose of moving the lower ends of the levers inward simultaneously the bearings for co-operation with the arms B are at the center of the levers, and the upper end of the levers are connected by links D with the collar E, journaled loosely on the nut F, working on the central screw-threaded stem A. For convenience in manufacture and operation of the device the nut F is provided with upwardly-projecting thumb-pieces $f$ and the central annular bearing in which the collar E works. The collar E is formed in halves for the sake of convenience in application, said halves being held together by screws $e$ or otherwise, and is further provided with lugs $e'$, corresponding to the bifurcated ends of the arms B, to form bearings for the inner ends of the links, as will be readily understood.

The lower ends of the clamping-levers D are provided with pivoted shoes $d$, adapted to engage and conform to the inclination of the surface of the work being operated upon as the lower ends of the levers are forced inward by the upward movement of the nut F, which latter is turned in the proper direction upon the screw-threaded stem by means of the upwardly-projecting thumb-pieces $f$. Working through the central stem and frame is the drill or punch carrier or stock H, having the punch or drill I at the bottom, which, it will be observed, is held at a point exactly equidistant from all the arms, whereby any work grasped by the arms must necessarily have its center beneath the point of the punch or drill. When the work is so grasped, the punch or drill-carrier H is depressed and rotated by means of a crank-handle K and the center marked or drilled. Extending from the central stem or frame and preferably slightly above and between two of the arms B is an arm L, to the end of which is pivoted a lever M, having its inner end bifurcated and provided with inwardly-projecting lugs $m$, adapted to enter an annular groove in the lower end of the punch or drill stock, as shown in Fig. 5, to force the spindle forward during the drilling operation.

In operation the work is first placed between the lower ends of the levers, which are then clamped against the same by screwing the thumb-nut F upward, and thereby forcing the upper ends of the said levers outward. The lever M is then raised and the punch or drill moved downward and rotated by means of the crank-handle, as before explained.

It will be observed that the device is exceedingly simple, easily operated, and by locating the thumb-nuts and links below the upper ends of the clamping-levers the device is made exceedingly compact and at the same time the clamping-levers may be set up quickly and forcibly and the punch operated without danger of disturbing the position of the work, and, further, by pivoting the levers directly on the frame the work is not forced away from the punch or drill point as the levers are set up.

Having thus described my invention, what I claim as new is—

1. In a centering device, the combination, with the frame having the tubular screw-threaded stem and the radially-disposed arms at the bottom of the same, of the centering and clamping levers pivoted on the ends of the arms, the nut working on the central screw-threaded stem below the upper ends of the levers, the collar surrounding the nut, and the links connecting said collar and the upper ends of the levers, substantially as described.

2. In a centering device, the combination, with the frame having the tubular screw-threaded stem and the regularly-disposed radial arms at the lower ends, the punch or drill stock working through said stem, and the lever for moving the spindle holding said stock elevated, of the centering and clamping levers pivotally mounted on the ends of said arms, pivoted shoes on the lower ends of said arms, the nut working on the central stem below the upper ends of the levers, the collar surrounding the nut, and the links connecting the said collar and the upper ends of the levers, substantially as described.

3. In a centering device, the combination, with the frame having the tubular screw-threaded stem, the regularly-disposed radial arms at the lower end, and the single arm projecting between said regularly-disposed arms, the punch or drill stock working through said stem and having the annular groove therein, and the lever pivoted on said intermediate arm and co-operating with the groove on the lower end of the punch-stock, of the centering and clamping levers pivotally mounted on the ends of said arms, the pivoted shoes on the lower ends of said levers, the nut working on the central stem below the upper ends of the levers, the collar surrounding the nut, and the links connecting the said collar and upper ends of the levers, substantially as described.

RICHARD C. NUGENT.

Witnesses:
   MAURY D. JENKINS,
   ALFRED L. HARBOLT.